US008525842B1

(12) United States Patent
Duluk, Jr. et al.

(10) Patent No.: US 8,525,842 B1
(45) Date of Patent: Sep. 3, 2013

(54) SYSTEM AND METHOD FOR UTILIZING SEMAPHORES IN A GRAPHICS PIPELINE

(75) Inventors: Jerome F. Duluk, Jr., Palo Alto, CA (US); Richard A. Silkebakken, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1338 days.

(21) Appl. No.: 11/454,389

(22) Filed: Jun. 16, 2006

(51) Int. Cl.
*G06T 1/20* (2006.01)

(52) U.S. Cl.
USPC .......................................................... 345/506

(58) Field of Classification Search
CPC ........................................................ G06T 1/20
USPC ................................. 345/501, 506; 712/209
See application file for complete search history.

(56) References Cited

U.S. PATENT DOCUMENTS

| 5,097,411 | A | * | 3/1992 | Doyle et al. | 345/522 |
| 5,706,415 | A | * | 1/1998 | Kelley et al. | 345/426 |
| 5,835,792 | A | * | 11/1998 | Wise et al. | 710/68 |
| 6,593,929 | B2 | * | 7/2003 | Van Hook et al. | 345/501 |
| 6,809,735 | B1 | * | 10/2004 | Stauffer et al. | 345/522 |
| 6,867,781 | B1 | * | 3/2005 | Van Hook et al. | 345/506 |
| 7,328,369 | B2 | * | 2/2008 | Manoni | 714/11 |
| 2004/0012596 | A1 | * | 1/2004 | Allen et al. | 345/501 |
| 2005/0149795 | A1 | * | 7/2005 | Manoni | 714/726 |

FOREIGN PATENT DOCUMENTS

WO   WO 03/093999 A2 * 11/2003

* cited by examiner

*Primary Examiner* — Jeffery A Brier
(74) *Attorney, Agent, or Firm* — Zilka-Kotab, PC

(57) ABSTRACT

A semaphore system, method, and computer program product are provided for use in a graphics environment. In operation, a semaphore is operated upon utilizing a plurality of graphics processing modules for a variety of graphics processing-related purposes (e.g. for example, controlling access to graphics data by the graphics processing modules, etc.).

10 Claims, 6 Drawing Sheets

SYSTEM AND METHOD FOR UTILIZING SEMAPHORES IN A GRAPHICS PIPELINE

FIELD OF THE INVENTION

The present invention relates to graphics pipelines, and more particularly to providing data access control in a graphics pipeline.

BACKGROUND

Prior art FIG. 1 illustrates a graphics pipeline 100, in accordance with the prior art. As shown, the graphics pipeline 100 is shown logically to include a plurality of modules 102 for performing various graphics processing operations. Just by way of example, such modules 102 may include a front end module 103 for receiving graphics data 109 in the form of primitives, and determining the manner and order in which pixels defining each primitive will be processed in order to render an image of such primitives.

Still yet, the modules 102 may include various other graphics processing modules including, but not limited to vertex and pixel shaders 105 for determining the surface properties of a vertex and pixel (or fragment, etc.), respectively. Of course, additional graphics processing modules may be included for providing various other graphics processing capabilities.

In use, such graphics processing modules 102 process the graphics data 109 for storage in a frame buffer 104 which, in turn, feeds a display 106. As graphics processing capabilities have advanced, the contents of the frame buffer 104 has often been "fed back" into various previous modules 102 of the graphics pipeline 100 for being re-processed in different ways. Such feed back 108 is shown in FIG. 1. Just by way of example, "render-to-vertex" and "render-to-texture" processing may be performed on the rendered graphics data 109 in the frame buffer 104 for enhancing an ultimately displayed output.

It should be noted that, during the course of such advanced processing, an inherent difficulty arises when first graphics data being operated upon by subsequent modules 102 in the graphics pipeline 100 produces first results in the frame buffer 104 that are required by previous modules 102 operating on second graphics data. In such situations, such results from the first graphics data may not be readily available when needed by processing of the second graphics data, thereby creating complications. For example, unavailability of necessary graphics data, conflicting requests for the same graphics data, etc. may be problematic to effective graphics processing.

To date, these and other related problems have been addressed by the aforementioned front end module 103. In particular, after first graphics data is input into the graphics pipeline 100, the front end module 103 typically waits until such first graphics data has been completely processed by all of the relevant graphics processing modules 102 in order to flush the results from the graphics pipeline 100, before admitting second graphics data. By this feature, it is ensured that the aforementioned results of the first graphics data is available if required for graphics processing in conjunction with the second graphics data by previous modules 102, etc.

Unfortunately, such waiting creates an inherent delay that impacts the ability of the graphics pipeline 100 to operate in a fast-paced manner. There is thus a need for overcoming these and/or other problems associated with the prior art.

SUMMARY

A semaphore system, method, and computer program product are provided for use in a graphics environment. In operation, a semaphore is operated upon utilizing a plurality of graphics processing modules for a variety of graphics processing-related purposes (e.g. for example, controlling access to graphics data by the graphics processing modules, etc.).

BRIEF DESCRIPTION OF THE DRAWINGS

Prior art

DETAILED DESCRIPTION

Figure 1:
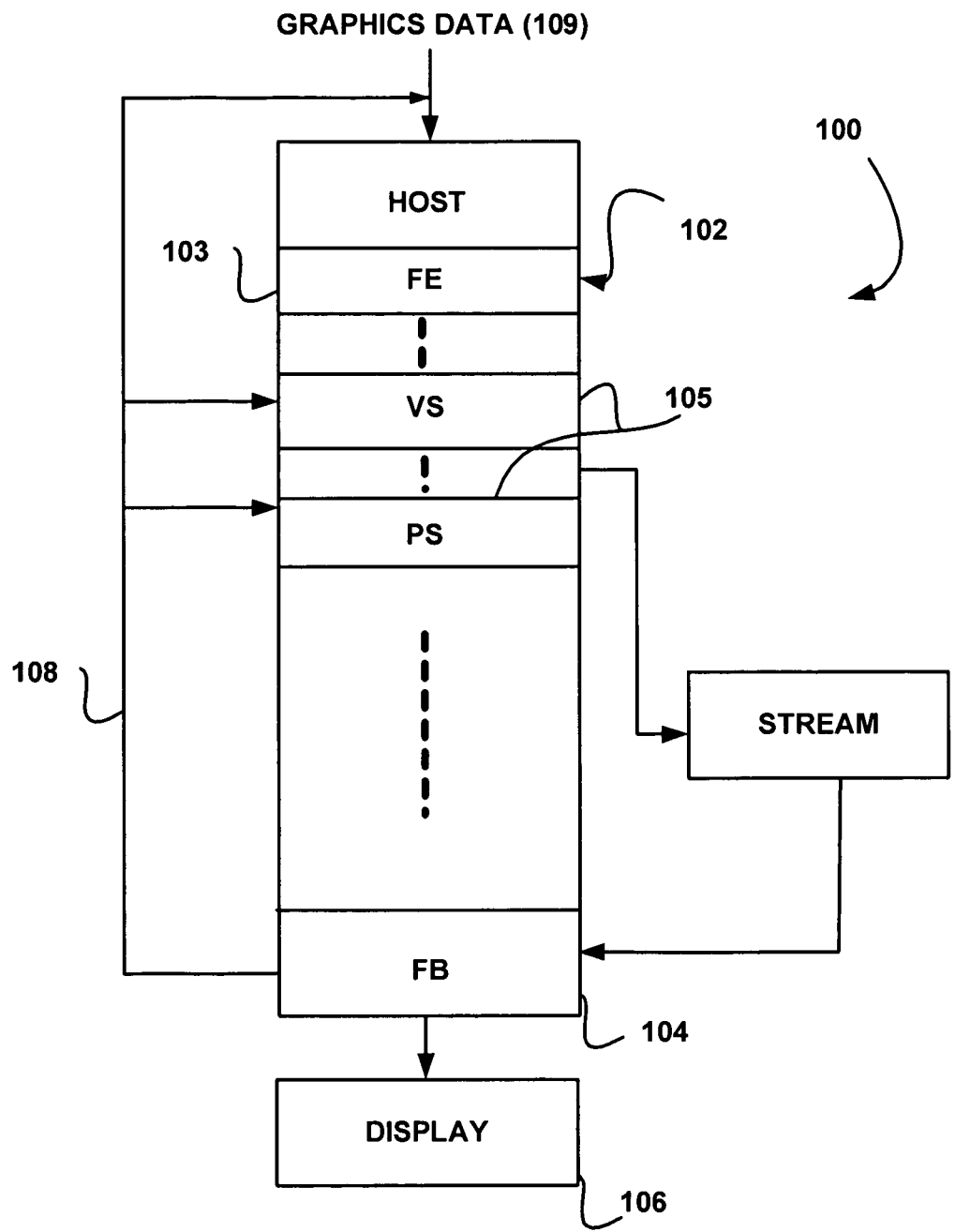
FIG. 1 illustrates a graphics pipeline, in accordance with the prior art.
Figure 2:
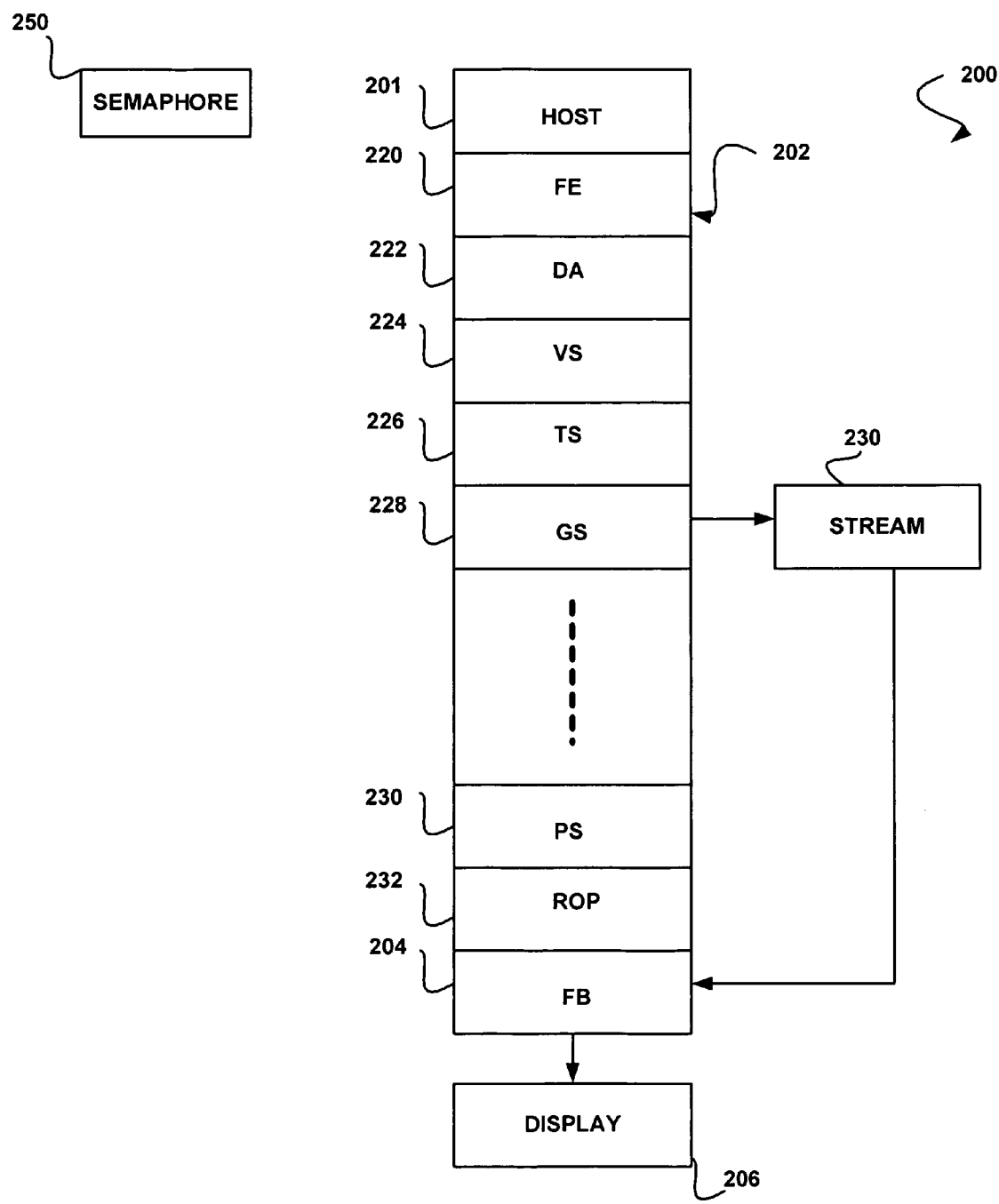
FIG. 2 shows a graphics system adapted for operating on a semaphore, in accordance with one embodiment.

FIG. 2 shows a graphics system 200 adapted for operating on a semaphore, in accordance with one embodiment. As shown, the graphics system 200 is shown to include a host 201 for providing graphics data to be processed by the rest of the graphics system 200. The graphics system 200 is further shown to logically include a plurality of modules 202 for performing various graphics processing operations.

In use, the graphics processing modules 202 process graphics data for storage in a frame buffer 204 which, in turn, feeds a display 206. In the context of the present description, the term graphics data may refer to vertex data, pixel data, fragment data, primitive (e.g. lines, points, etc.) data, and/or any other data associated with graphics processing. While the various modules 202 are shown to be integral, it should be noted that such components of the graphics system 200 are logically illustrated. Thus, each of the foregoing modules 202 (as well as the host 201, frame buffer 204, etc.) may or may not be situated on a single semiconductor platform, and multiple modules 202 may be performed by the same physical processor or array of physical processors.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules 202 may also be situated separately or in various combinations of semiconductor platforms per the desires of the user.

In various embodiments, the aforementioned graphics processing modules 202 may include a front end 220, a data assembler 222, a vertex shader 224, a tessellation shader 226, a geometry shader 228, a pixel shader 230, a raster-operation module 232, a frame buffer 204, and/or any other desired graphics processing modules. In operation, the front end 220 serves to receive primitives, commands to fetch primitives, and other commands, and determines the manner and order in which pixels defining each primitive will be processed to render an image of such primitive. Further, the vertex shader 224, tessellation shader 226, geometry shader 228, and pixel shader 230 operate for determining the surface properties of associated vertices, tessellation patches, geometries, pixels, respectively. To facilitate operation of the shaders, the data assembler 222 serves to provide the correspondence between vertices and primitives, as well as associate attributes with vertices or primitives. The graphics system 200 may include a stream module 230 for selecting and formatting vertex data for storage into the frame buffer 204.

With reference now to the raster-operation module 232, such module serves for performing various alpha and z-buffering tests involving the graphics data processed by the different shaders. To this end, the processed graphics data is stored in the frame buffer 204 which, in turn, is used to refresh frames depicted utilizing the display 206. It should be noted that the foregoing graphics processing modules 202 are set forth for illustrative purposes only and should not be construed as limiting in any manner. Specifically, any graphics processing modules may be included which are capable of performing any graphics-related processing.

For reasons that will soon become apparent, at least one semaphore 250 may be provided for using during operation of the graphics system 200. In the context of the present description, a semaphore refers to any data structure capable of being used for controlling access to data for various purposes including, but not limited to synchronization purposes, communication between asynchronous processes, reporting, and/or any other purpose requiring data access control. It should be further noted that the semaphore(s) 250 may be stored in any desired memory (e.g. on or off-board/chip memory with respect to the aforementioned single semiconductor platform, etc.), and may further be accessible to on and/or off-board/chip processes, etc.

In use, any one or more of the graphics processing modules 202 may operate on the semaphore(s) 250 for a variety of graphics processing-related purposes. Just by way of example, in some embodiments, an acquire operation may be used for reading data (e.g. graphics data, etc.), and a release operation may be used for writing data during use of the graphics processing modules 202. More information regarding these and other exemplary operations will be set forth during the description of FIGS. 4-6.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
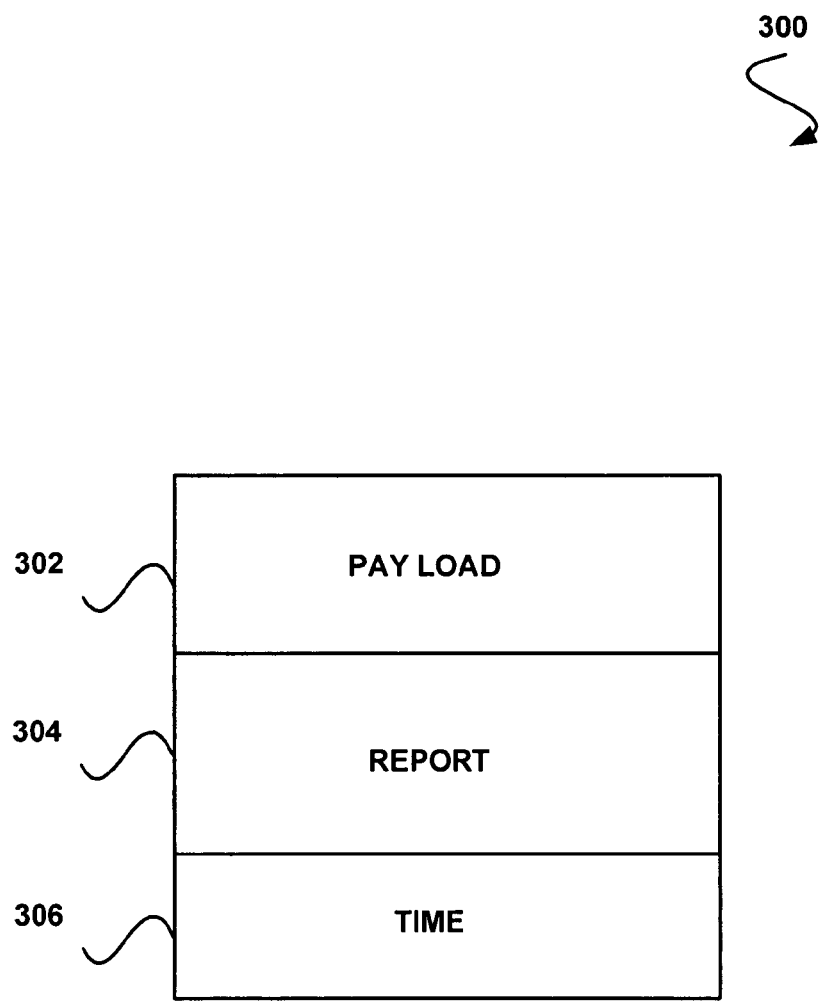
FIG. 3 illustrates an exemplary semaphore data structure for use in a graphics environment, in accordance with one embodiment.

FIG. 3 illustrates an exemplary semaphore data structure 300 for use in a graphics environment, in accordance with one embodiment. As an option, the present semaphore data structure 300 may be implemented in the context of the architecture and environment of FIG. 2. Of course, however, the semaphore data structure 300 may be used in any desired environment.

As shown, the semaphore data structure 300 includes a plurality of sections including a payload section 302, a report section 304, and a time section 306. In use, the payload section 302 may include information regarding the corresponding data to which access is controlled. For example, the payload section 302 generally includes a reference or sequence number that can be used for synchronization, and may optionally identify an associated graphics processing module as well as an indication as to an operation (e.g.

acquire, release, etc.) to which the semaphore is subject by the identified graphics processing module.

Further, the report section 304 may include various information (e.g. statistics, etc.) for reporting purposes. For example, such statistics may include a count of various vertices, primitives, etc. for a variety of purposes that will be set forth hereinafter in greater detail. Still yet, the time section 306 may include a time stamp representing various times associated with the data access control.

Table 1 illustrates exemplary contents of one embodiment of the semaphore data structure 300, including options for either 32-bit or 64-bit report values, and well as little endian or big endian data types.

TABLE 1

| | 32-bit reports | |
|---|---|---|
| byte | Data (LittleEndian) | Data (BigEndian) |
| 0 | Payload[7:0] | Payload[31:24] |
| 1 | Payload[15:8] | Payload[23:16] |
| 2 | Payload[23:16] | Payload[15:8] |
| 3 | Payload[31:24] | Payload[7:0] |
| 4 | report_value[7:0] | report_value[31:24] |
| 5 | report_value[15:8] | report_value[23:16] |
| 6 | report_value[23:16] | report_value[15:8] |
| 7 | report_value[31:24] | report_value[7:0] |
| 8 | timer[7:0] | timer[63:56] |
| 9 | timer[15:8] | timer[55:48] |
| 10 | timer[23:16] | timer[47:40] |
| 11 | timer[31:24] | timer[39:32] |
| 12 | timer[39:32] | timer[31:24] |
| 13 | timer[47:40] | timer[23:16] |
| 14 | timer[55:48] | timer[15:8] |
| 15 | timer[63:56] | timer[7:0] |

| | 64-bit reports | |
|---|---|---|
| byte | Data (LittleEndian) | Data (BigEndian) |
| 0 | report_value[7:0] | report_value[63:56] |
| 1 | report_value[15:8] | report_value[55:48] |
| 2 | report_value[23:16] | report_value[47:40] |
| 3 | report_value[31:24] | report_value[39:32] |
| 4 | report_value[39:32] | report_value[31:24] |
| 5 | report_value[47:40] | report_value[23:16] |
| 6 | report_value[55:48] | report_value[15:8] |
| 7 | report_value[63:56] | report_value[7:0] |
| 8 | timer[7:0] | timer[63:56] |
| 9 | timer[15:8] | timer[55:48] |
| 10 | timer[23:16] | timer[47:40] |
| 11 | timer[31:24] | timer[39:32] |
| 12 | timer[39:32] | timer[31:24] |
| 13 | timer[47:40] | timer[23:16] |
| 14 | timer[55:48] | timer[15:8] |
| 15 | timer[63:56] | timer[7:0] |

It should be strongly noted that the contents of Table 1 are set forth for illustrative purposes only and should not be construed as limiting in any manner. Further, as shown, either the payload section 302 may be adapted for augmenting the report section 304. Of course, the time section 306 may be similarly used for augmentation purposes as well, if desired. In some embodiments, the semaphore data structure 300 can optionally include only a payload section 302.

Table 2 illustrates exemplary data reported via the report section 304, which may or may not be augmented, as desired. In some embodiments, the semaphore data structure 300 can optionally include only a report section 304.

TABLE 2

| Report | Report Width | Send Payload | PipelineLocation |
|---|---|---|---|
| NONE | 32 | Yes | N/A |
| DA_VERTICES_GENERATED | 64 | No | DATA_ASSEMBLER |
| DA_PRIMITIVES_GENERATED | 64 | No | DATA_ASSEMBLER |
| VS_INVOCATIONS | 64 | No | VERTEX_SHADER |
| GS_INVOCATIONS | 64 | No | GEOMETRY_SHADER |
| GS_PRIMITIVES_GENERATED | 64 | No | GEOMETRY_SHADER |
| STREAMING_STATUS | 32 | Yes | STREAMING_OUTPUT |
| STREAMING_PRIMITIVES_SUCCEEDED | 64 | No | STREAMING_OUTPUT |
| STREAMING_PRIMITIVES_NEEDED | 64 | No | STREAMING_OUTPUT |
| CLIPPER_INVOCATIONS | 64 | No | VPC |
| CLIPPER_PRIMITIVES_GENERATED | 64 | No | VPC |
| ZCULL_STATS0 | 32 | Yes | ZCULL |
| ZCULL_STATS1 | 32 | Yes | ZCULL |
| ZCULL_STATS2 | 32 | Yes | ZCULL |
| ZCULL_STATS3 | 32 | Yes | ZCULL |
| PS_INVOCATIONS | 64 | No | PIXEL_SHADER |
| ZPASS_PIXEL_CNT | 32 | Yes | ALL |
| ZPASS_PIXEL_CNT64 | 64 | No | ALL |
| STREAMING_BYTES_SUCCEEDED | 64 | No | STREAMING_OUTPUT |
| STREAMING_BYTES_NEEDED | 64 | No | STREAMING_OUTPUT |

The DA_VERTICES_GENERATED report counts vertices output from the data assembler 222, with the report value obtained from a counter that is initialized to zero when a graphics channel is created so that it may be incremented, without being reset, until the graphics channel is destroyed or optionally reinitialized to zero during operation. It should be noted that any of the following reports may be incremented in a similar manner, optionally disabled at times, or optionally reinitialized, as desired. The DA_PRIMITIVES_GENERATED report counts primitives output from the data assembler 232. The VS_INVOCATIONS report counts a number of launched vertex shader threads. The GS_INVOCATIONS report counts a number of launched geometry shader threads. The GS_PRIMITIVES_GENERATED report counts the number of primitives generated by geometry shaders. Still yet, the STREAMING_STATUS report contains a particular value if a streaming buffer overrun has occurred.

With continuing reference to Table 1, the STREAMING_PRIMITIVES_SUCCEEDED report counts primitives successfully written by the stream module 552. Further, the STREAMING_PRIMITIVES_NEEDED report counts primitives that were attempted to be written by the stream output module 552. The STREAMING_BYTES_SUCCEEDED report counts the bytes in the primitives successfully written by the stream module 552. The STREAMING_BYTES_NEEDED report counts the bytes in the primitives that were attempted to be written by the stream output module 552. The CLIPPER_INVOCATIONS report counts the number of primitives that undergo geometry clipping. The CLIPPER_PRIMITIVES_GENERATED counts the number of primitives generated by geometry clipping.

Even still, the ZCULL_STATS0 through ZCULL_STATS3 reports contain information about a block-pixel culling module that is optionally included in the graphics system 200 before the pixel shader 230. In one embodiment, the ZCULL_STATS0 report contains a number of particularly sized tiles that flowed through a culling stage. The ZCULL_STATS1 report contains a number of particularly sized pixel blocks culled due to failing a z-test. Pixel blocks simultaneously culled by a stencil test are not necessarily (but may be) included in this count. Since this culling occurs before rasterization is complete, such pixels may not necessarily be inside the primitive. The ZCULL_STATS2 report contains a number of particularly sized pixel blocks culled because they are in front of a previous drawing. Still yet, the ZCULL_STATS3 report contains a number of particularly sized pixel blocks that were culled by a stencil test. Pixels which were counted in ZCULL_STATS2 may be excluded from this count.

Finally, the PS_INVOCATIONS report counts a number of launched pixel shader threads. Still yet, the ZPASS_PIXEL_CNT64 report contains the current value of a particular counter that counts a number of samples which passed a z-test. Further, the ZPASS_PIXEL_CNT report contains a value clamped to $2^{32}-1$.

Again, such reports are illustrative in nature and should not be construed as limiting in any manner, as any report (or no report at all) is contemplated. Still yet, such report information may be used by any desired graphics processing module for facilitating associated graphics processing (e.g. by conditionally rendering based on the information, etc.).

Figure 4:
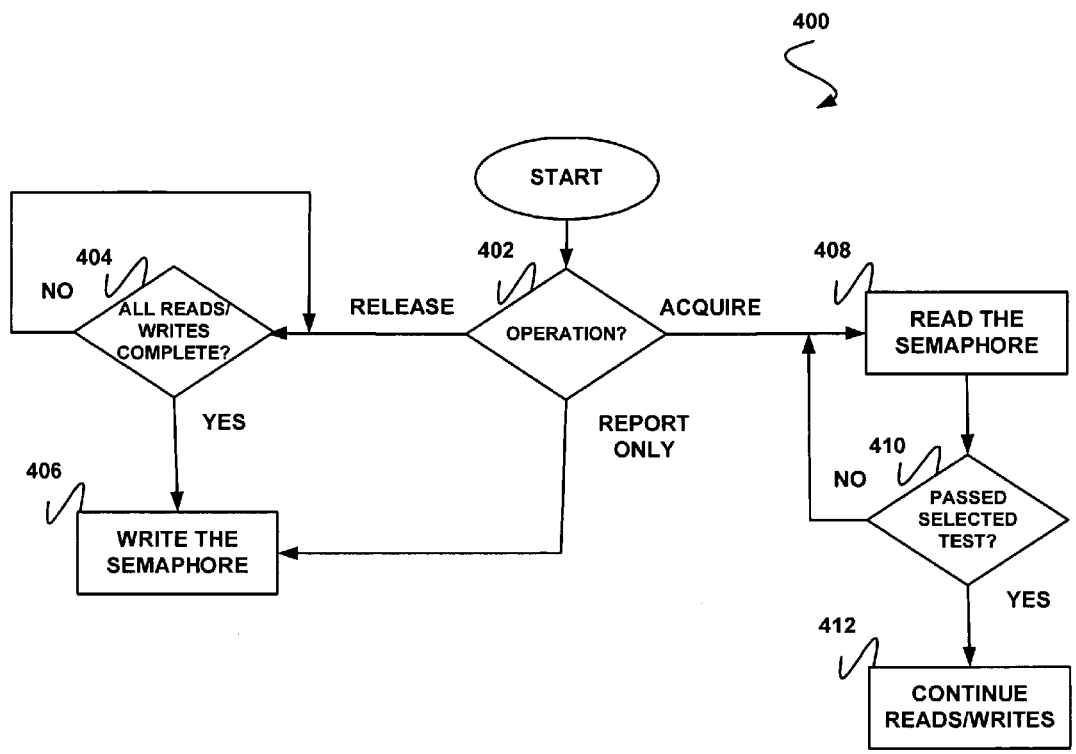
FIG. 4 illustrates an exemplary method for operating on a semaphore in a graphics environment, in accordance with one embodiment.

FIG. 4 illustrates an exemplary method 400 for operating on a semaphore in a graphics environment, in accordance with one embodiment. As an option, the present method 400 may be implemented in the context of the architecture and environment of FIGS. 2-3. Of course, however, the method 400 may be carried out in any desired environment.

As shown, it is first determined in decision 402 as which of a plurality of operations is to be performed on a semaphore (e.g. see, for example, the semaphores of FIGS. 2 and/or 3, etc.). If, for example, it is determined in decision 402 that a release operation is to be performed, it is first determined whether all previous read operations and/or write operations have been performed per decision 404. If not, the method 400 polls, waiting for such read operations and/or write operations to complete, as shown.

On the other hand, if and when it is determined that all previous read operations and/or write operations have been performed per decision 404, the semaphore data structure is written, per operation 406. Note, for example, the various content that may be written in FIG. 3. In one embodiment, the aforementioned polling ensures that the semaphore is written after read and/or write operations have been completed, thereby making the semaphore an effective indicator to other modules or processes that the read and/or write operations are done. For example, a release operation can be used to indicate the usage of a memory resource (e.g. a texture) is complete, and therefore the memory resource is available for reuse.

Returning to decision 402, if it is determined that the operation to be performed on the semaphore is a report only operation, the semaphore may simply be written, without the aforementioned polling. See, again, operation 406. Thus, the semaphore may be written for reporting purposes, irrespective of whether any read operations and/or write operations are not yet complete.

Still yet, if it is determined in decision 402 that the operation to be performed on the semaphore is an acquire operation, the semaphore may be read. It may then be determined whether the contents of the semaphore data structure (e.g. see, for example, the payload section 302 of FIG. 3, etc.) passes a selected test. See decision 410. Specifically, it may be determined whether, for example, a release operation (see operation 406) has written the contents of the semaphore in a manner which indicates that corresponding data is available for use.

The selected test used in decision 410 can be a comparison between the payload 302 and data in a command supplied to the front end 220. The comparison can be selected from: equal-to; not-equal-to; less-than; greater-than; less-than-or-equal-to; or greater-than-or-equal-to. Some embodiments may only use a subset of the comparison choices.

Once the selected test 410 has succeeded, read operations and/or write operations associated with the data corresponding to the semaphore is guaranteed to have completed, and another module (e.g. a pixel shader) or process (e.g. a program on a CPU, or another graphics processor) can safely read the data or write the data. See operation 412. To this end, in one embodiment, the semaphore may be repeatedly read per operations 408-410 until it indicates that the associated read/write operations are complete, indicated via a successful related test. An example of the foregoing release and acquire operations will be set forth in greater detail during reference to FIG. 5.

In various embodiments, it is possible that the polling of operations 408-410 may consume considerable bandwidth (and thus reduce system performance), especially if the semaphore is stored in memory located off chip. Thus, in another embodiment, the polling of operations 408-410 may be avoided by providing dedicated hardware for the semaphore, which accepts a notification of an attempted acquire, which means a release is awaited, and that the module requesting the acquire operation is waiting for the associated data. To this end, when the corresponding semaphore is operated upon with a release operation, the dedicated hardware may directly notify the acquiring module that the release is received, avoiding the polling of aforementioned embodiments. Still yet, a further enhancement may be provided if the dedicated hardware is located on an integrated circuit on which the graphics processing modules are situated, thereby minimizing latency.

Figure 5:
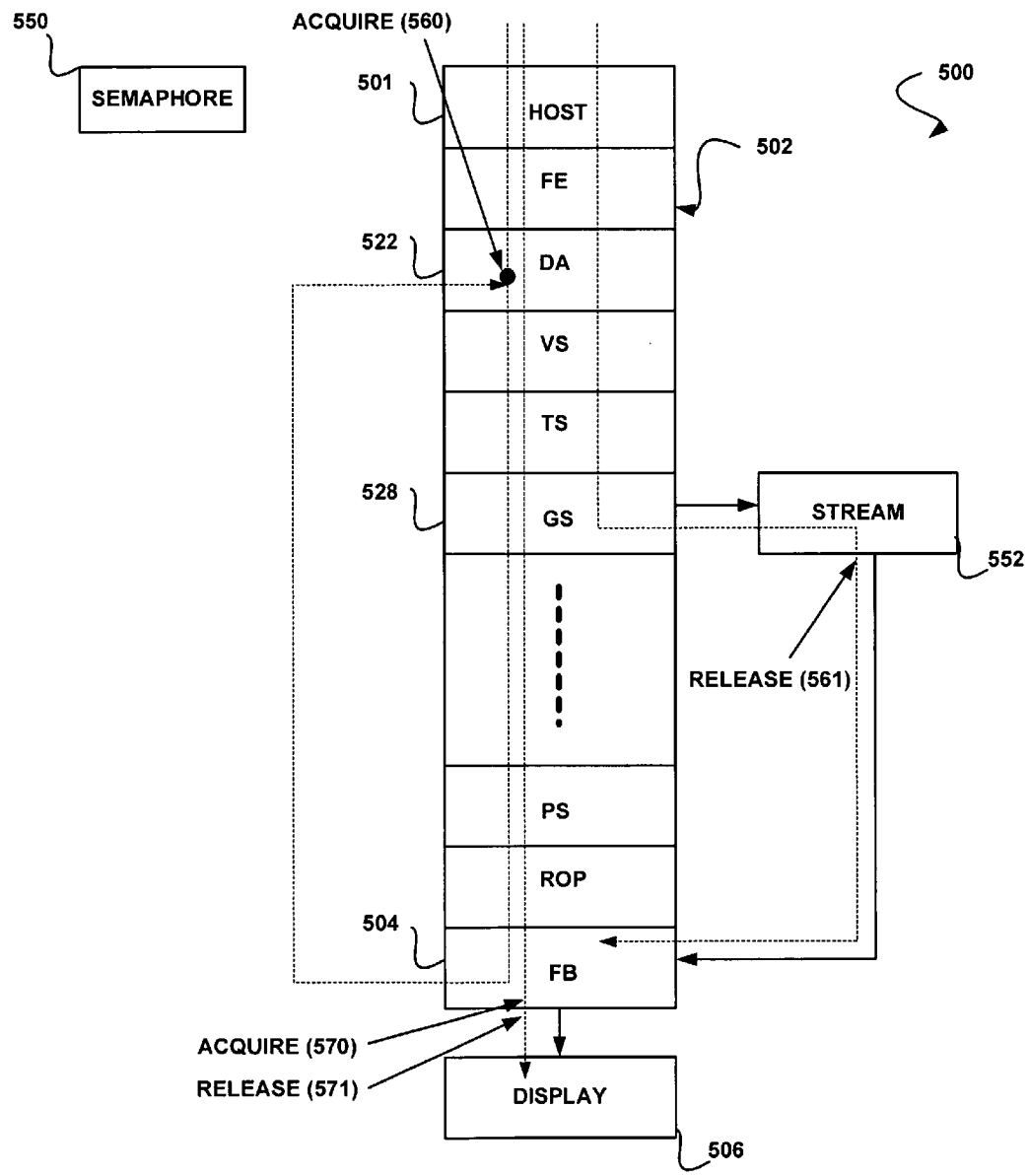
FIG. 5 shows a graphics system during use whereby at least one semaphore is operated upon for synchronization purposes, in accordance with one embodiment.

FIG. 5 shows a graphics system 500 during use whereby at least one semaphore is operated upon for synchronization purposes, in accordance with one embodiment. As an option, the use of the graphics system 500 may be implemented in the context of the architecture and environment of FIGS. 2-4. Of course, however, the graphics system 500 may be used in any desired manner.

Similar to the graphics system 200 of FIG. 2, the present graphics system 500 includes a host 501 feeding a plurality of graphics processing modules 502 (e.g. a data assembler 522, a frame buffer 504, geometry shader 528, etc.) similar to those set forth during the description of FIG. 2, for performing various graphics processing operations, before displaying a resultant image on a display 506.

In one example of use, a semaphore 550 may be used during operation of the various modules 502 for synchronization purposes. Specifically, graphics data output from the geometry shader 528 via the stream module 552 (and/or any other module(s), for that matter) may be currently subject to processing, storage, etc., but requested by the data assembler 522. This situation may arise when output from the stream module 552 is stored in the frame buffer 504, but is then desired for being "fed back" into previous modules 502 (e.g. the data assembler 522, etc.) of the graphics pipeline 500 for being re-processed in various ways.

In such case, the semaphore 550 associated with the output from the stream module 552 of graphics data may be operated upon by the data assembler 522 using an acquire operation (e.g. see, for example, the acquire operation of FIG. 4, etc.). See acquire operation 560. Specifically, a payload associated with the semaphore 550 may be read until it indicates that a selected test has passed (i.e. the appropriate graphics data is ready for reading, etc.).

In the meantime, the stream module 552, when appropriate may operate on the same semaphore 550 with a release operation 561 (e.g. see, for example, the release operation of FIG. 4, etc.). Such release operation 561 ensures that all previously initiated read operations/write operations by the stream module 552 have completed, indicating that data is available for use by other modules such as the data assembler 522. When such determination has been made by the stream module 552, the payload of the semaphore is written in such a manner that the polling read operations of the data assembler 522 result in a passing test, thus indicating that the data assembler 522 may now read the data written by the stream module 552 for related processing.

It should be noted that the foregoing acquire and/or release operations are equally applicable to other modules (e.g. the display 506, host 501, etc.) of the graphics system 500. Just by way of example, a situation may arise whereby the contents of the frame buffer 504 may be desired by the display 506 for refreshing the same. In such case, the display 506 may operate on the appropriate semaphore 550 associated with the contents of the frame buffer 504. Specifically, an acquire operation 570 may be used to gain access to such graphics data, once the frame buffer 504 operates on the same using a release operation 571.

As a specific example, the graphics system 500 can render a current frame into a first buffer in a double buffered portion of the frame buffer 504 while a previous frame in a second buffer in the double buffered portion of the frame buffer 504 is being displayed on the display 506. When the rendering of the current frame is complete, there is a need to stop displaying the previous frame and start displaying the current frame, but this should only occur during the vertical blanking time of the display 506, else visual artifacts will occur. Furthermore, rendering of the next frame writes data into the second buffer, but needs to wait until the previous frame is no longer being displayed, else visual artifacts may occur on the display 506.

To facilitate swapping from the previous frame to the current frame without visual artifacts, one or more semaphores are used, wherein: (i) the graphics system 500 performs a semaphore release operation to indicate rendering of the current frame is complete; (ii) the hardware controlling the display 506 performs an acquire operation to determine when the current frame is ready for display; (iii) the hardware controlling the display 506 performs a release operation to indicate the first buffer can be overwritten, since displaying of the previous frame is no longer being done; and (iv) the graphics system 500 performs an acquire operation before overwriting the previous frame with the next frame in the first buffer.

By way of another example, the graphics system 500 can be used to render to a texture that is then used in the rendering of some other picture, and furthermore, when the rendering of the other picture is complete, the memory that is used to store the texture can be reused for some other purpose (including the rendering of another texture). In such case, one or more semaphores are used, wherein: (i) the graphics system 500 performs a semaphore release operation to indicate rendering of the texture is complete; (ii) the shader that is going to use the texture (or any earlier module in the graphics system 500) performs an acquire operation to determine when the texture rendering is complete and the texture can be used; (iii) when the texture usage is complete, the shader (or any later module in the graphics system) performs a release operation to indicate the texture can be overwritten; and (iv) the graphics system 500 performs an acquire operation before overwriting the texture with new data.

Still yet, other operations may be used with respect to a desired semaphore 550 for purposes other than acquire and/or release, for synchronizing access to graphics data. For instance, in cases where statistics associated with the graphics data associated with the semaphore 550, a report only operation (e.g. see, for example, the report-only operation of FIG. 4, etc.) may be used to prompt a report section of the semaphore 550 to be written with desired statistics, etc.

Figure 6:
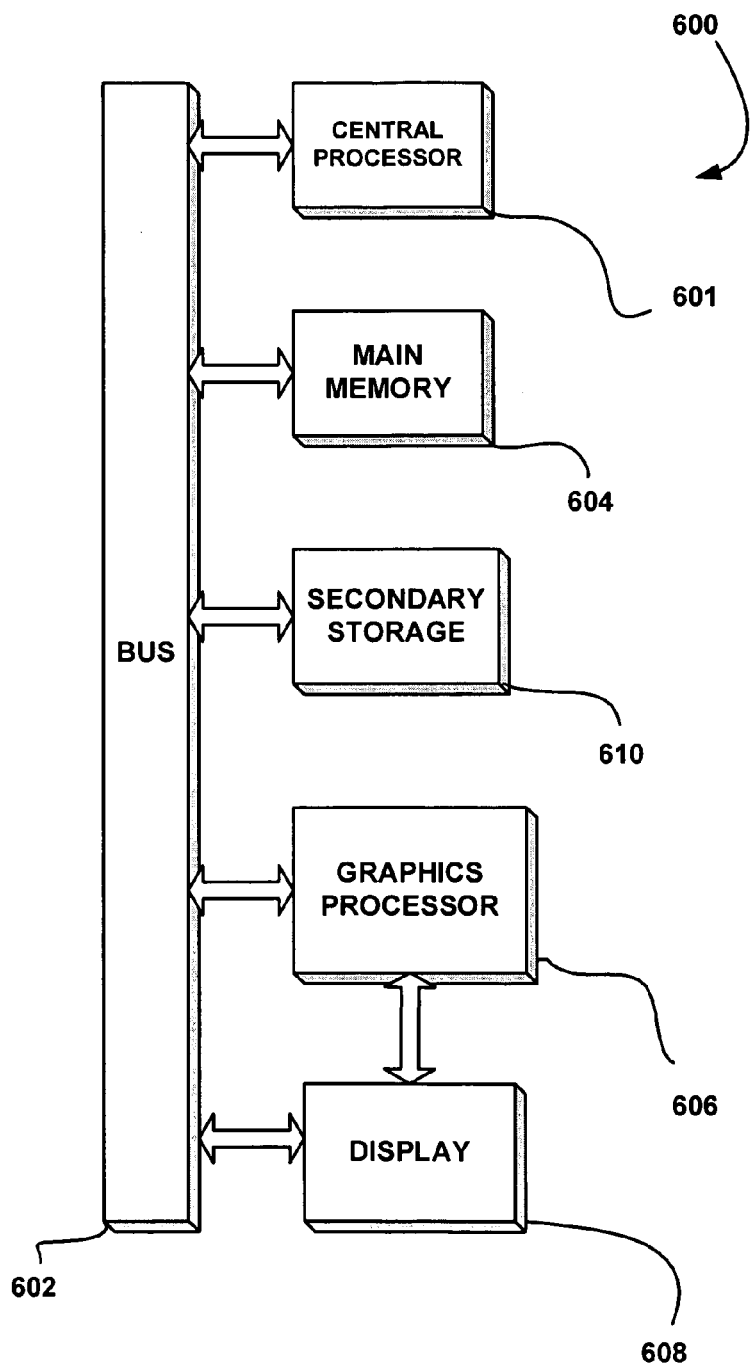
FIG. 6 illustrates an exemplary computer system in which the various architecture and/or functionality of the various previous embodiments may be implemented.

FIG. 6 illustrates an exemplary computer system 600 in which the various architecture and/or functionality of the various previous embodiments may be implemented. As shown, a computer system 600 is provided including at least one host processor 601 which is connected to a communication bus 602. The computer system 600 also includes a main memory 604. Control logic (software) and data are stored in the main memory 604 which may take the form of random access memory (RAM).

The computer system 600 also includes a graphics processor 606 and a display 608, i.e. a computer monitor. In one embodiment, the graphics processor 606 may include any of the modules mentioned hereinabove during reference to FIG. 2. Each of the foregoing modules may even be situated on a single semiconductor platform to form a graphics processing unit (GPU).

The computer system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the computer system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
   identifying a semaphore; and
   operating on the semaphore utilizing a plurality of graphics processing modules of a hardware graphics processor;
   wherein the semaphore is adapted for synchronizing access to graphics data by the graphics processing modules and further providing data access control including controlling access to the graphics data by the graphics processing modules;
   wherein the semaphore includes a time section;
   wherein the time section includes a time stamp representing various times associated with the data access control.

2. The method of claim 1, wherein the graphics processing modules include at least one of a front end, a data assembler, a vertex shader, a tessellation shader, a geometry shader, a pixel shader, a raster-operation module, and a frame buffer.

3. The method of claim 1, wherein the semaphore includes a plurality of sections including at least one of a payload section and a report section.

4. The method of claim 1, wherein the semaphore includes a payload section and a report section.

5. The method of claim 4, wherein the report section includes statistics associated with graphics data.

6. The method of claim 5, wherein at least one of the payload section and the time section is adapted for augmenting the report section.

7. The method of claim 1, wherein the semaphore is adapted for synchronizing the access to the graphics data by the graphics processing module and a display.

8. A computer program product embodied on a non-transitory computer readable medium, comprising:
   a semaphore data structure; and
   computer code for operating on the semaphore data structure utilizing at least one graphics processing module of a hardware graphics processor;
   wherein the semaphore is adapted for synchronizing access to graphics data by the graphics processing modules and further providing data access control including controlling access to the graphics data by the graphics processing modules;
   wherein the semaphore includes a time section;
   wherein the time section includes a time stamp representing various times associated with the data access control.

9. An apparatus, comprising:
   non-transitory computer-readable media for storing executable instructions;
   memory for storing a semaphore data structure; and
   a hardware graphics processor in communication with the memory and the non-transitory computer-readable media, the hardware graphics processor including a plurality of graphics processing modules, wherein the hardware graphics processor is operable to execute the executable instructions for causing the plurality of graphics processing modules to operate on the semaphore data structure;
   wherein the semaphore is adapted for synchronizing access to graphics data by the graphics processing modules of the hardware graphics processor, and further providing data access control including controlling access to the graphics data by the graphics processing modules of the hardware graphics processor;
   wherein the semaphore includes a time section;
   wherein the time section includes a time stamp representing various times associated with the data access control.

10. The apparatus of claim 9, wherein the hardware graphics processor is in communication with a display.

* * * * *